United States Patent
Rhim et al.

(10) Patent No.: US 7,995,567 B2
(45) Date of Patent: Aug. 9, 2011

(54) APPARATUS AND METHOD FOR NETWORK CONTROL

(75) Inventors: Sangwoo Rhim, Yongin-si (KR); Eui Seok Kim, Suwon-si (KR); Beom Hak Lee, Seoul (KR); Beom Seok Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 11/873,443

(22) Filed: Oct. 17, 2007

(65) Prior Publication Data

US 2009/0024783 A1 Jan. 22, 2009

(30) Foreign Application Priority Data

Jul. 20, 2007 (KR) .................. 10-2007-0072736

(51) Int. Cl.
*H04L 12/50* (2006.01)

(52) U.S. Cl. ........ 370/358; 370/391; 370/216; 370/248; 710/316; 710/308

(58) Field of Classification Search .................. 370/310, 370/389, 338, 254, 255, 256, 257, 358, 258, 370/474, 475, 477; 710/105, 113, 128, 129, 710/131, 316, 308, 310, 268
See application file for complete search history.

(56) References Cited

U.S. PATENT DOCUMENTS

| | | | |
|---|---|---|---|
| 6,173,349 B1 * | 1/2001 | Qureshi et al. | 710/110 |
| 2003/0086395 A1 * | 5/2003 | Shanbhag | 370/331 |
| 2004/0193824 A1 * | 9/2004 | Johnson | 711/170 |
| 2005/0025078 A1 * | 2/2005 | Hwang | 370/310 |
| 2005/0035963 A1 * | 2/2005 | Iizuka et al. | 345/419 |
| 2005/0273537 A1 * | 12/2005 | Harris et al. | 710/110 |
| 2006/0179260 A1 * | 8/2006 | Yoon | 711/154 |
| 2007/0061496 A1 * | 3/2007 | Nishino | 710/100 |
| 2007/0075834 A1 * | 4/2007 | Armstrong et al. | 340/10.1 |
| 2007/0185708 A1 * | 8/2007 | Manjunath et al. | 704/207 |

* cited by examiner

*Primary Examiner* — Pankaj Kumar
*Assistant Examiner* — Anez Ebrahim
(74) *Attorney, Agent, or Firm* — Sughrue Mion, PLLC

(57) ABSTRACT

A network control apparatus and network control method is provided. The network control apparatus including: a content addressable memory receiving to store a plurality of addresses which are generated by at least one master intellectual property, determining whether data corresponding to each of the plurality of stored addresses is received, and generating a determination signal; and a packet decoder transmitting each of the plurality of stored addresses and the data corresponding to each of the plurality of stored addresses to a slave intellectual property according to the determination signal. Accordingly, a multiple address issue function can be supported.

24 Claims, 9 Drawing Sheets

APPARATUS AND METHOD FOR NETWORK CONTROL

CROSS-REFERENCE TO RELATED APPLICATION

This application claims priority from Korean Patent Application No. 10-2007-0072736, filed on Jul. 20, 2007, in the Korean Intellectual Property Office, the entire disclosure of which is incorporated herein by reference.

BACKGROUND OF THE INVENTION

1. Field of the Invention

Methods and apparatuses consistent with the present invention relate to a network control apparatus and a network control method. More particularly, the present invention relates to a network control apparatus and a network control method which control an address and data transmission/reception between a master intellectual property and a slave intellectual property 2. Description of Related Art As minimization of a semiconductor chip is realized due to development of semiconductor manufacturing technologies and circuit designing, a plurality of functional modules embedded in separate chips are currently integrated into a single chip.

A system-on-chip (SoC) is a semiconductor technology which integrates all components or other electronic systems into a single chip, and development of the SoC enables convergence of a computer, communication, broadcasting, and the like.

Also, due to the development of the SoC, an application specific integrated circuit (ASIC) and an application specific standard product (ASSP), which conventionally have been embedded in separate chips, are integrated into a single chip.

Specifically, a module in the SoC, which performs a function of a conventional ASIC or ASSP, is referred to as an intellectual property (IP). A study for connecting a plurality of IPs, which are distributively embedded in a chip, is briskly conducted with regard to a process of substituting an IP in the SoC for a function embedded in separate chips.

A connection method based on a Bus is a mainly used to connect the IPs. However, the connection method based on the Bus has a problem in that other IPs are not able to use a Bus when even a single IP uses the Bus. Accordingly, as a number of IPs embedded in the chip is increased, and an amount of information flowing between the IPs is increased, the SoC using the Bus architecture is reaching its practical limitation.

To solve the functional limitation of the SoC using the Bus architecture, a network-on-chip (NoC) technology has been recently proposed. The NoC connects the IPs by suitably adapting a general network technology to the SoC.

Alternatively, an advanced microcontroller Bus architecture (AMBA) by ARM Holdings PLC has been proposed, the AMBA conventionally being used as a Bus standard for connection and management between IPs embodied in the SoC. There are a high-performance Bus (AHB), an advanced peripheral Bus, and an advance extensible interface (AXI) as examples of derivative Bus architectures included in the AMBA. The AXI is an interface protocol of an IP, and includes developed functions such as a multiple outstanding address function and a data interleaving function.

The AXI Bus method includes a developed function, however quite a number of lines are required to embody an address path and a data path since the address path and the data path are physically separate.

Accordingly, the AXI Bus has problems in that, the AXI Bus requires a large amount of space, connection between IPs is difficult, and power consumption is great when voltage switching occurs in lines that configure the address path and the data path.

Therefore, a new network control apparatus and method, which can connect IPs, which are suitably designed for the AXI Bus in a chip embodied using the SoC, have an effective Bus architecture, and utilize advantages of the AXI, is required.

SUMMARY OF THE INVENTION

An aspect of the present invention provides a network control apparatus and a network control method which support a multiple outstanding address function without increasing a number of gates which configure a Bus, thereby reducing required space and power consumption, and can easily connect a plurality of intellectual properties (IPs).

Another aspect of the present invention also provides a network control apparatus and a network control method which can optimize data transmission/reception performance by selecting a suitable architecture according to a feature of a master intellectual property, without increasing complexity of a hardware embodiment.

According to an aspect of the present invention, there is provided a network control apparatus including: a content addressable memory receiving to store a plurality of addresses which are generated by at least one master intellectual property, determining whether data corresponding to each of the plurality of stored addresses is received, and generating a determination signal; and a packet decoder transmitting each of the plurality of stored addresses and the data corresponding to each of the plurality of stored addresses to a slave intellectual property according to the determination signal.

According to another aspect of the present invention, there is provided a network control apparatus including: a temporary memory receiving a plurality of addresses from a master intellectual property, and storing the received plurality of addresses in a received order; and an arbiter combining the data received from the master intellectual property with an address which is first stored in the temporary memory to generate a packet, and transmitting the generated packet to a slave intellectual property.

According to another aspect of the present invention, there is provided a network control apparatus including: a packet encoder transmitting a handshake signal to a master intellectual property to prevent transmission of another address until data corresponding to a previously received address is received from the master intellectual property; and an arbiter receiving the previously received address from the packet encoder when the data is received from the master intellectual property, combining the received address with the received data to generate a packet, and transmitting the generated packet to a slave intellectual property.

According to another aspect of the present invention, there is provided a network control apparatus including: a master network interface receiving to store an address from a master intellectual property, and transmitting the address and data corresponding to the address to a slave intellectual property; a network router receiving the address and the data from the master network interface, and routing channels of the received address and the received data; and a slave network interface receiving to store the address from the network router, and transmitting the stored address and the received data to the slave intellectual property when the data is received.

According to another aspect of the present invention, there is provided a network control method including: receiving to store a plurality of addresses which are generated by at least one master intellectual property;

determining whether data corresponding to each of the plurality of stored addresses is received, and generating a determination signal; and transmitting each of the plurality of stored addresses and the data corresponding to each of the stored plurality of addresses to a slave intellectual property according to the determination signal.

According to an aspect of the present invention, there is provided a network control method including: receiving a plurality of addresses from the master intellectual property, and storing the received addresses in a received order; and combining the data received from the master intellectual property with an address which is first stored to generate a packet, and transmitting the generated packet to a slave intellectual property.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
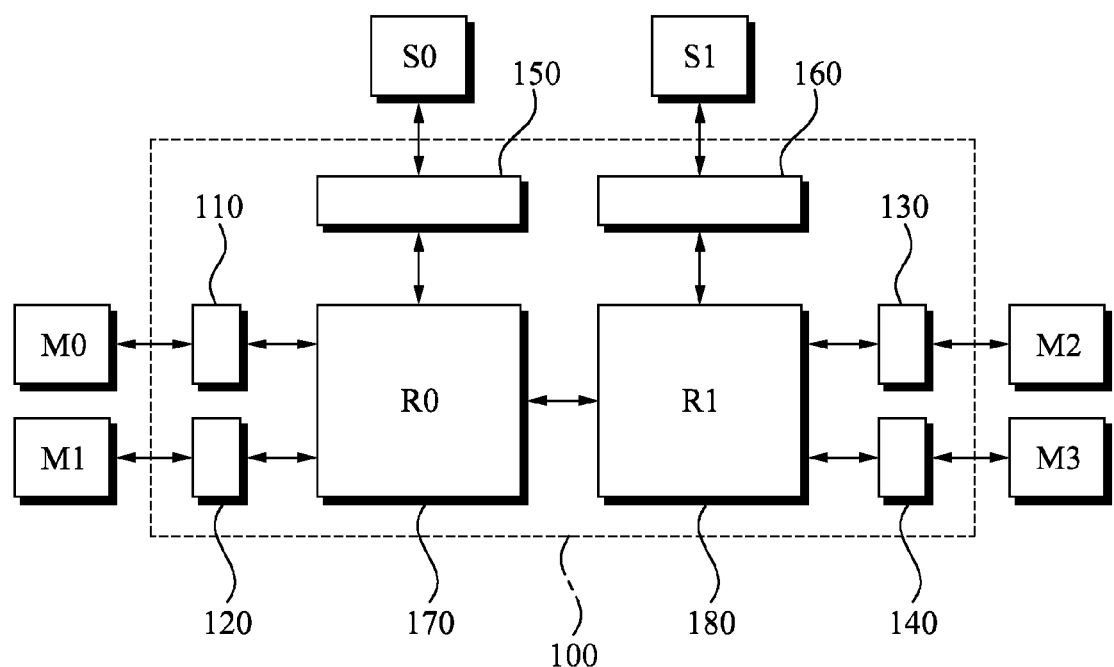
FIG. 1 is a diagram illustrating a network-on-chip (NoC) system using a network control apparatus according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

In the specification of the present invention, each of intellectual properties (IPs) is classified into a subject IP and an object IP for data write and data read, and the subject IP for data write and data read is referred to as a master intellectual property, and the object IP for data write and data read is referred to as a slave intellectual property.

FIG. 1 is a diagram illustrating a network-on-chip (NoC) 100 system using a network control apparatus according to an exemplary embodiment of the present invention.

Referring to FIG. 1, the NoC system 100 includes master network interfaces 110, 120, 130, and 140, slave network interfaces 150 and 160, and network routers 170 and 180.

A master intellectual property M0 is connected with the network router (R0) 170 via the master network interface 110, and a master intellectual property M1 is connected with the network router (R0) 170 via the master network interface 120.

A master intellectual property M2 is connected with the network router (R1) 180 via the master network interface 130, and a master intellectual property M3 is connected with the network router (R1) 180 via the master network interface 140.

A slave intellectual property S0 is connected with the network router (R0) 170 via the slave network interface 150.

A slave intellectual property S1 is connected with the network router (R1) 180 via the slave network interface 160.

The master intellectual properties M0 through M3, the slave intellectual properties S0 through S3, and other modules (not shown) in the NoC system 100 are connected with each other via signals according to an advance extensible interface (AXI) protocol. In the AXI Bus architecture, each channel of a write address packet AW, a write data packet WD, a read address packet AR, a read data packet RD, and a write response packet B are respectively separate.

A write transaction is performed as described below.

A master intellectual property transmits an address via an AW channel and transmits data via a WD channel.

A slave intellectual property receives the transmitted address and data.

The slave intellectual property stores the received data in a location indicated by the received address.

In this instance, the write transaction sequentially transmits data corresponding to adjacent addresses, and the transmitting of the data corresponding to adjacent addresses is referred to as a burst transaction.

The burst write transaction sequentially transmits an address of data, which will be first transmitted, via an AW channel, and transmits data, which will be sequentially transmitted, via a WD channel.

As an example, when stored data of "0100" to "0103" are transmitted during the burst write transaction, the burst write transaction transmits only "0100" via an AW channel. When four adjacent data are sequentially transmitted, a length of a burst is considered to be four.

When the burst write transaction is used, an entire amount of transmission via a Bus may be reduced since a number of addresses transmitted via the AW channel is reduced.

Also, when the burst write transaction is used, it is possible to use an interval between transmissions occurring between transmitted addresses since a single address is transmitted via the AW channel while a plurality of adjacent data are transmitted via the WD channel.

An advance extensible interface (AXI) bus supports a multiple outstanding address function. The multiple outstanding address function is also referred to as a multiple address issuing.

A write transaction is generally performed as described below.

A write address is transmitted from a master intellectual property via an AW channel.

Write data is transmitted from the master intellectual property via a WD channel. When a transaction has a burst length of four, four adjacent data may be sequentially transmitted.

A slave intellectual property transmits a reception confirm message to the master intellectual property when all of the transmitted four adjacent data are received.

When two write transactions are performed in an NoC system which does not support the multiple outstanding address function, a reception confirm message with respect to a first write transaction is received in the master intellectual property, and a second write transaction starts after the first write transaction is completed.

When two write transactions are performed in an NoC system which supports the multiple outstanding address function, a write address of a first write transaction and a write address of a second write transaction may be sequentially transmitted without waiting for a reception confirm message.

Four data of a first write transaction and four data of a second write transaction may be sequentially transmitted from the master intellectual property via the WD channel.

The slave intellectual property transmits a reception confirm message with respect to the first write transaction when all of the four data of the first write transaction are received.

The slave intellectual property transmits a reception confirm message with respect to the second write transaction when all of the four data of the second write transaction are received.

To support the multiple outstanding address function, an identification code enabling identification of transactions is required to be included in the reception confirm messages, which are transmitted from the slave intellectual property to the master intellectual property.

Figure 2:
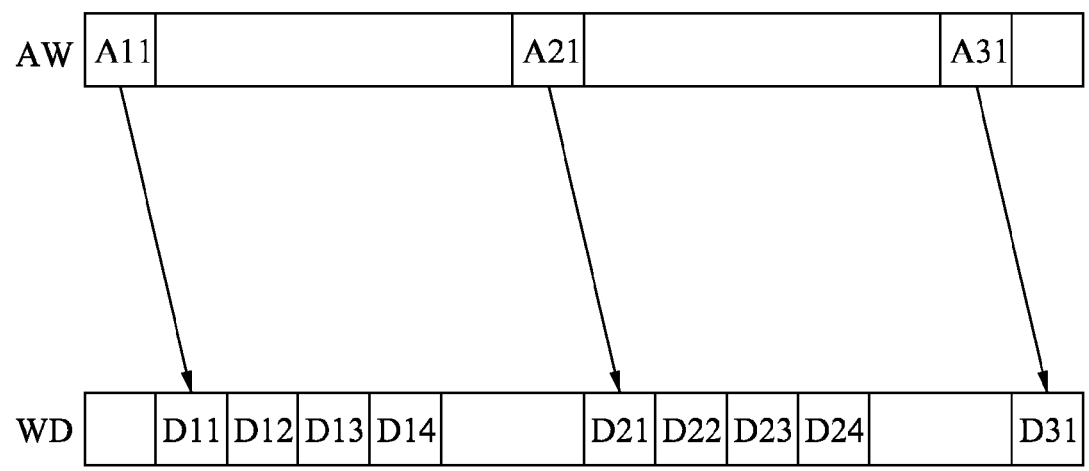
FIG. 2 is a diagram illustrating three write transactions sequentially performed in an NoC system which does not support a multiple outstanding address function.

FIG. 2 is a diagram illustrating three write transactions sequentially performed in an NoC system which does not support a multiple outstanding address function.

Referring to FIG. 2, a master intellectual property transmits a write address A11 of a first write transaction via an AW channel.

The master intellectual property transmits write data D11 through D14 of the first write transaction via a WD channel.

The slave intellectual property transmits a reception confirm message with respect to the first write transaction when all of the write data D11 through D14 are received.

The master intellectual property transmits a write address A21 of a second write transaction via an AW channel when the reception confirm message with respect to the first write transaction is received.

Similarly, the master intellectual property transmits a write address A31 of a third write transaction via the AW channel after a reception confirm message with respect to the second write transaction is received.

Figure 3:
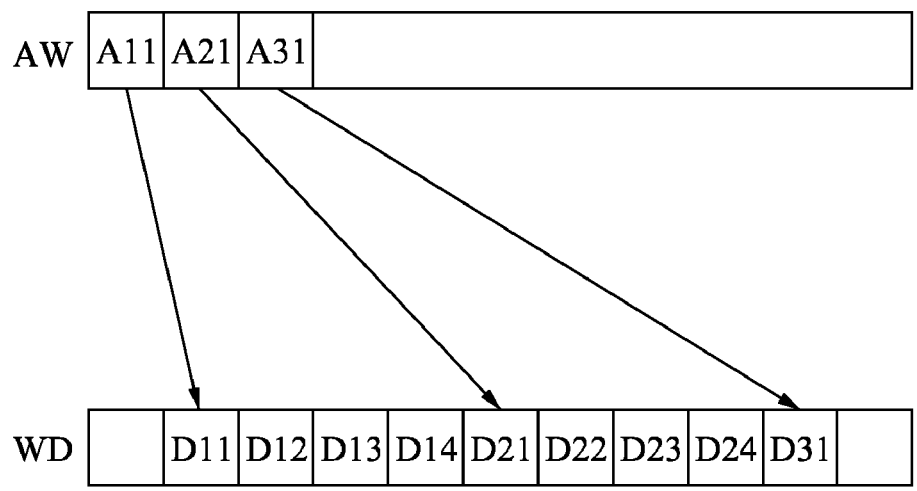
FIG. 3 is a diagram illustrating three write transactions sequentially performed in an NoC system which supports a multiple outstanding address function.

FIG. 3 is a diagram illustrating three write transactions are sequentially performed in an NoC system which supports a multiple outstanding address function.

Referring to FIG. 3, a master intellectual property transmits write addresses A11 through A13 of the three write transactions via an AW channel.

The master intellectual property transmits write data D11 through D14, D21 through D24, and D31 through D34 of the three write transactions via a WD channel.

A slave intellectual property transmits a reception confirm message with respect to a first write transaction when all of the write data D11 through D14 are received.

The slave intellectual property transmits a reception confirm message with respect to a second write transaction when all of the write data D21 through D24 are received.

The slave intellectual property transmits a reception confirm message with respect to a third write transaction when the write data D31 is received.

The master intellectual property of the NoC system which supports the multiple outstanding address function may start a new transaction before a current transaction is completed. Accordingly, it is possible to process transactions in parallel, thereby reducing time required to receive/transmit data.

To support the multiple outstanding address function, an identification code enabling identification of transactions is required to be included in the transmitted address, the transmitted data, and the reception confirm messages.

As described with reference to FIG. 3, when three write transactions can be processed in parallel, a depth of the multiple outstanding address function is considered to be three. That is, a maximum number of multiple issues may be three.

Figure 4:
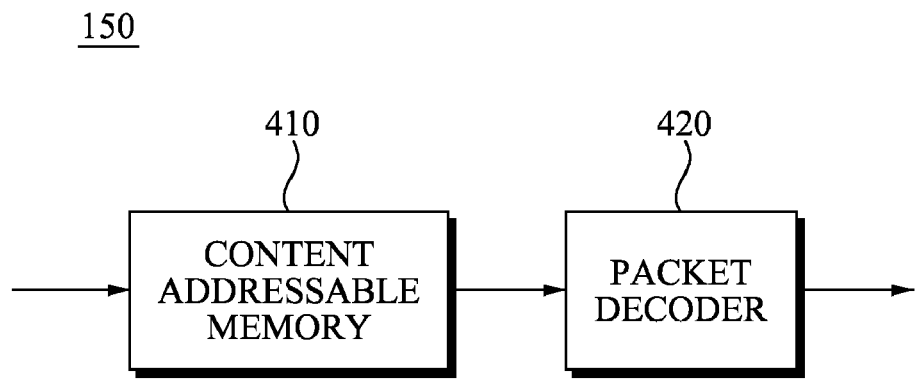
FIG. 4 is a block diagram illustrating a slave network interface of FIG. 1.

FIG. 4 is a block diagram illustrating a slave network interface 150 of FIG. 1.

Referring to FIG. 4, the slave network interface 150 includes a content addressable memory 410 and a packet decoder 420.

The content addressable memory 410 receives to store a plurality of addresses which are generated by at least one master intellectual property, determines whether data corresponding to each of the plurality of stored addresses is received, and generates a determination signal.

The determination signal includes information informing which address of addresses stored in the content addressable memory 410 are identical.

The packet decoder 420 transmits each of the plurality of stored addresses and the data corresponding to each of the plurality of stored addresses to a slave intellectual property according to the generated determination signal.

When a depth of a multiple outstanding address function is four, since a single master intellectual property may sequentially generate to transmit four addresses, the determination signal includes identification information of at least two bits in order to identify the four addresses.

It is assumed that a master intellectual property M0 supports a multiple outstanding address function of a depth of four. A write transaction, in which an address and data are transmitted from the master intellectual property M0 to a slave intellectual property S0, is performed as described below.

The master intellectual property M0 generates an address packet including a transaction number (the transaction numbers requiring at least two-bit information since a maximum number of transactions is four) which enables identification of an address and a transaction, and transmits the generated address packet to the slave network interface 150 via a master network interface 110 and a network router 170.

The master intellectual property M0 generates a data packet including write data and a transaction number even when transmitting data, and transmits the generated data packet to the slave network interface 150 via the master network interface 110 and the network router (R0) 170.

The NoC system 100 of FIG. 1 of the present invention may fully support the multiple outstanding address function of the master intellectual property M0 due to the content addressable memory 410 and the packet decoder 420 included in the slave network interface 150.

Figure 5:
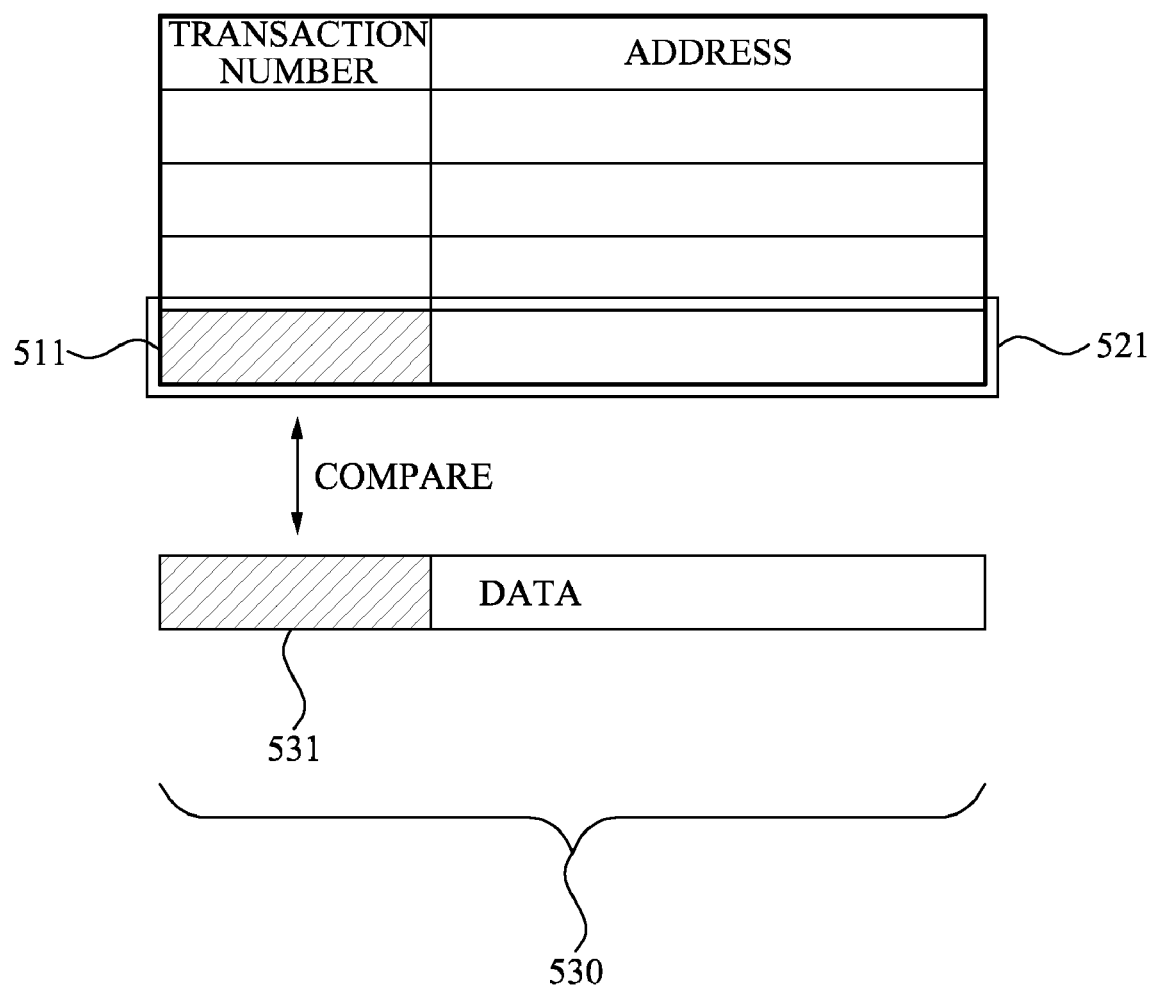
FIG. 5 is a diagram illustrating an operation of a content addressable memory of FIG. 4 which determines whether data corresponding to an address stored in the content addressable memory is received.

FIG. 5 is a diagram illustrating an operation of the content addressable memory 410 of FIG. 4, which determines whether data corresponding to an address stored in the content addressable memory 410 is received.

Referring to FIG. 5, the contents addressable memory 410 stores a transaction number and an address from received address packet.

When a transaction number 531 included in a received address packet 530 is identical to a transaction number 511 of transaction numbers stored in the content addressable memory 410, the content addressable 410 generates a determination signal from a transaction number and address 521 corresponding to the transaction number 511.

An address packet generated by a master intellectual property M0 further includes an identification code, the identification code indicating that the address packet is generated by the master intellectual property M0. Since both a master intellectual property M1 and the master intellectual property M0 may generate an address packet, the content addressable memory 410 is required to be able to identify which master intellectual property generated a particular address packet.

The content addressable memory 410 of the NoC system 100 of the present invention may fully support a multiple outstanding address function of a plurality of master intellectual properties via the operations described above with reference to FIG. 5.

Referring back to FIGS. 1 and 4, the packet decoder 420 and the slave intellectual property S0 are connected with each other via the address channel and the data channel, and the address channel and the data channel are separate from each other. It is a feature of an AXI bus that an address channel and a data channel are separate from each other.

When master intellectual properties M0 and M1 support a multiple outstanding address function of a depth of four, the content address memory 410 has a space capable of storing eight addresses that is a multiplication of '2' by '4', i.e. a number of the master intellectual properties multiplied by a depth of multiple outstanding address functions.

When each of the master intellectual properties M0 and M1 can process four transactions in parallel, there is a probability that each of the master intellectual properties M0 and M1 may transmit data after sequentially transmitting the four addresses, thus the content addressable memory 410 is required to have the space capable of storing at least eight addresses to support the multiple outstanding address function.

In this instance, each of master network interfaces 110 and 120 respectively receives a plurality of address packets from the master intellectual properties M0 and M1, and transmits the received plurality of address packets to the content addressable memory 410 included in a slave network interface 150 via a network router 170.

In this instance, the content addressable memory 410 receives to store the plurality of addresses which are generated by the master intellectual properties M0 and M1. The content addressable memory 410 receives data, and determines whether the received data corresponds to any one of the plurality of stored addresses. And when the received data corresponds to one of the plurality of stored addresses, the content addressable memory 410 determines whether the received data is generated by the same master intellectual property which has generated the one of the plurality of stored addresses.

The NoC system 100 of the present invention is installed on the same chip as the master intellectual properties M0 and M1 and the slave intellectual properties S0 and S1. In a conventional network system, intellectual properties are embedded in separate chips, and data is received and/or transmitted via a motherboard. Conversely, according to the present invention, intellectual properties are embedded in a single chip, thereby reducing power consumption and time for propagation of a signal.

Figure 6:
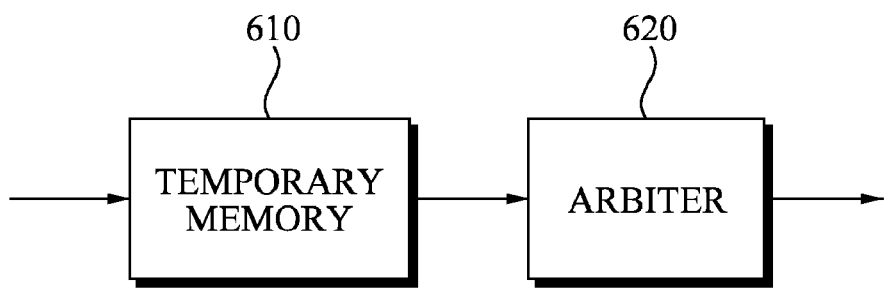
FIG. 6 is a block diagram illustrating a master network interface of FIG. 1.

FIG. 6 is a block diagram illustrating a master network interface 130 of FIG. 1.

Referring to FIG. 6, the master network interface 130 includes a temporary memory 610 and an arbiter 620.

The temporary memory 610 receives a plurality of addresses from a master intellectual property M2, and stores the received plurality of addresses in a received order.

The arbiter 610 combines the data received from the master intellectual property M2 with an address which is first stored in the temporary memory 610 to generate a packet, and transmits the generated packet to a slave intellectual property S1.

When the master intellectual property M2 supports a multiple outstanding address function of a depth of four, the temporary memory 610 has a space capable of storing four addresses, which correspond to the multiple outstanding address function of a depth of four of the master intellectual property M2.

When the master intellectual property M2 can process four transactions in parallel, since there is a probability that the master intellectual properties M2 may transmit data after sequentially transmitting the four addresses, the temporary memory 610 is required to have the space capable of storing at least four addresses to support the multiple outstanding address function.

The NoC system 100 may support the multiple outstanding address function of the master intellectual property M2 due to the temporary memory 610 and the arbiter 620 included in a master network interface 130. In this instance, although the master intellectual property M2 may process up to four transactions in parallel, a packet, in which an address and data are combined with each other, is transmitted via a network router (R1) 180. Accordingly, the four transactions are not performed in parallel in the slave intellectual property S1, and the four transactions are performed in serial according to an order of receiving each packet.

That is, the NoC system 100 may partially support the multiple outstanding address of the master intellectual property M2 through the temporary memory 610 and the arbiter 620 included in the master network interface 130. In this instance, data transmission/reception performance may be deteriorated in comparison to an embodiment fully supporting a multiple outstanding address function, however complexity of a hardware embodiment may be greatly reduced.

In the embodiment fully supporting a multiple outstanding address function, each of slave network interfaces is required to have a content addressable memory, which is capable of storing as many addresses as a number of master intellectual properties multiplied by a number of depths of multiple outstanding address functions. Conversely, in an embodiment partially supporting a multiple outstanding address function, since each of master network interfaces is required to have a temporary memory capable of storing only as many addresses as a depth of the multiple outstanding address function, higher data transmission/reception performance is traded for reduced embodiment complexity.

Figure 7:
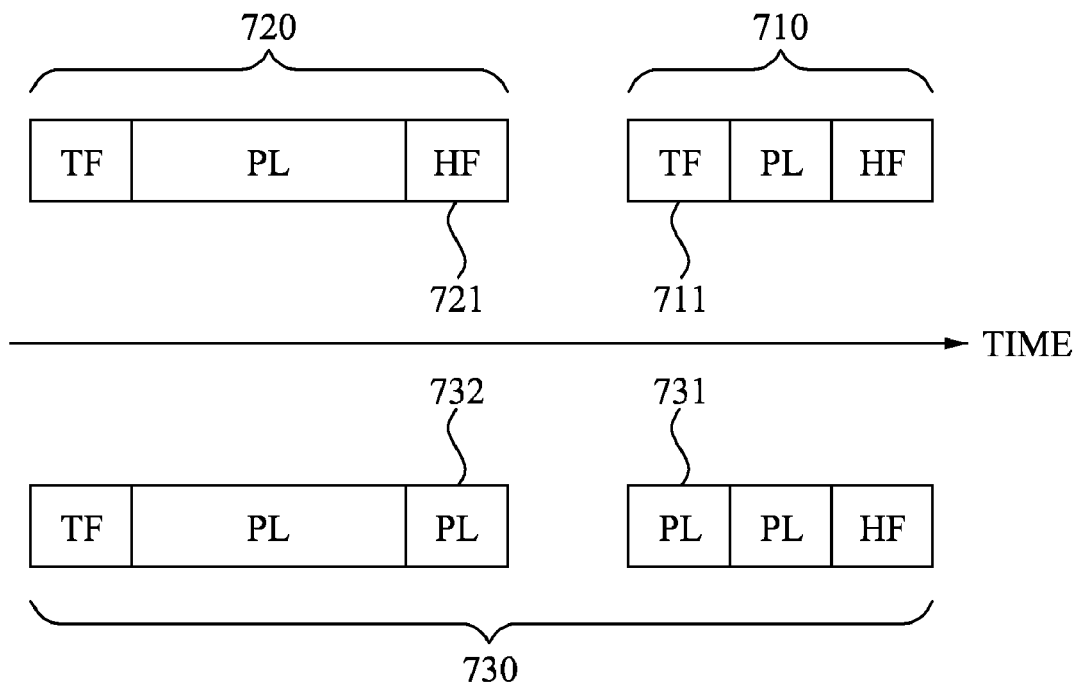
FIG. 7 is a diagram illustrating an operation of an arbiter of FIG. 6, which combines an address and data to generate a packet.

FIG. 7 is a diagram illustrating the arbiter 620 of FIG. 6, which combines an address and data to generate a packet.

Referring to FIG. 7, the arbiter 620 combines data 720 received from a master intellectual property M2 with an address which is first stored in the temporary memory 610 to generate a packet 730.

Each of the address 710 and the data 720 includes a head flit, a payload flit, and a tail flit. A network router (R1) 180 activates a request message and an acknowledge message by identifying a flit type of a received address and a received data.

The arbiter 620 generates the packet 730 by substituting a payload flit for a tail flit 711 of the address 710, and for a head flit 721 of the data 720.

Since the packet 730 includes a single head flit and a single tail flit, the network router (R1) 180 identifies the packet 730 as a single packet to perform a transaction.

The arbiter 620 transmits the packet 730 to a slave intellectual property S1 via the slave network interface 160 of FIG. 1.

The slave network interface 160 receives the packet 730 from the arbiter 620, and separates the address 710 and the data 720 from the received packet 730 to transmit the separated address 710 and the data 720 to the slave intellectual property S1.

The slave network interface 160 generates two packets by substituting a tail flit for a front third payload flit 731 of the packet 730, and by substituting a head flit for a front fourth payload flit 732 of the packet 730.

Since a master network interface 130 sequentially combines an address with data generated from a master intellectual property M2, generates a single packet, and transmits the generated single packet to the slave network interface 160, the slave network interface 160 transmits the separated address and data to the slave intellectual property S1 without additionally storing the separated address and data.

Figure 8:
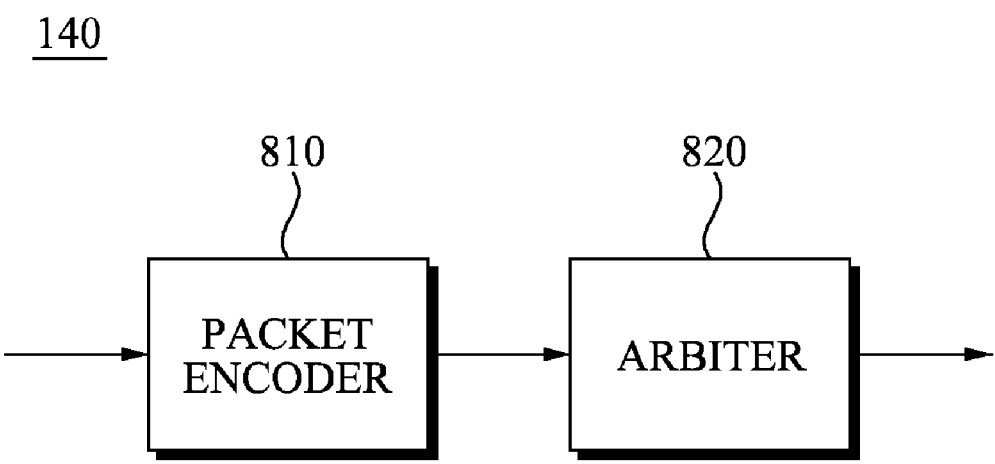
FIG. 8 is a block diagram illustrating a master network interface of FIG. 1.

FIG. 8 is a block diagram illustrating the master network interface 140 of FIG. 1.

Referring to FIG. 8, the master network interface 140 includes a packet encoder 810 and an arbiter 820.

The packet encoder 810 transmits a handshake signal to a master intellectual property M3 to prevent transmission of another address until data corresponding to a previously received address is received from the master intellectual property M3.

That is, the packet encoder 810 enables the master intellectual property M3 to transmit the address and data in an appropriate order and at appropriate times using the handshake signal. In this instance, the master intellectual property M3 does not support a multiple outstanding address function.

The arbiter 820 receives the previously received address from the packet encoder 810 when the data is received, combines the previously received address with the data to generate a packet, and transmits the generated packet to a slave intellectual property S1.

The arbiter 820 generates the packet by substituting a payload flit for a tail flit of the previously received address, and for a head flit of the received data. Operations of generating the packet by the arbiter 820 are identical to the operations of generating the packet by the arbiter 620 described above with reference to FIG. 7.

The arbiter 820 transmits the generated packet to a slave intellectual property S1 via a slave network interface 160.

The slave network interface 160 receives the generated packet from the arbiter 820, and separates an address and data from the received packet to transmit the separated address and data to the slave intellectual property S1.

The slave network interface 160 generates two packets by substituting a tail flit for a front third payload flit of the received packet, and by substituting a head flit for a front fourth payload flit of the received packet.

Depending on applications, supporting a multiple outstanding function by master intellectual properties may not have a great effect on performance. In this case, reducing embodiment complexity of a hardware is advantageous even though the master intellectual properties do not support the multiple outstanding address function.

The NoC system 100 of FIG. 1 may reduce complexity of a hardware embodiment due to a packet encoder 810 and the arbiter 820 of FIG. 8 included in the master network interface 140, since a multiple outstanding address function is not supported.

That is, depending on embodiments, when a master intellectual property does not require a multiple outstanding address function, an embodiment that a master network interface and a slave network interface do not support the multiple outstanding address function may be advantageous. In this instance, since the master network interface and the slave network interface are not required to include a memory circuit, complexity of a hardware embodiment can be greatly reduced.

Also, the NoC system 100 of the present invention may optimize data transmission/reception performance and reduce a size of a memory circuit.

Since a master intellectual property supporting a multiple outstanding address function may perform a plurality of transactions in parallel, the master intellectual property supporting the multiple outstanding address function may increase data transmission/reception performance, however the multiple outstanding address function may be irrelevant depending on applications.

To support a multiple outstanding address function, complexity of a hardware embodiment is inevitably increased to embody a master intellectual property and blocks peripheral to the master intellectual property. Accordingly, in the case of a master intellectual property which is not required to use a multiple outstanding address function, the complexity of the hardware embodiment may be reduced by excluding blocks necessary for the multiple outstanding address function.

As an example, as illustrated in FIG. 1, it is assumed that the master intellectual properties M0 and M1 support a multiple outstanding address function of a depth of four, and it is also assumed that the master intellectual property M2 supports a multiple outstanding address function of a depth of four, however use of the multiple outstanding address function is infrequent.

Also, it is assumed that the master intellectual property M3 does not support a multiple outstanding address function.

The master network interface 110 connected with the master intellectual property M0 receives a plurality of addresses from the master intellectual property M0, and transmits the received plurality of addresses to the slave intellectual properties S0 and S1 via the network routers (R0) 170 and (R1) 180.

The master network interface 120 connected with the master intellectual property M1 receives a plurality of addresses from the master intellectual property M1, and transmits the received plurality of addresses to the slave intellectual properties S0 and S1 via the network routers (R0) 170 and (R1) 180.

The master network interface 130 connected with the master intellectual property M2 includes the temporary memory 610 and the arbiter 620, the temporary memory 610 receiving a plurality of addresses from the master intellectual property M2 and storing the received plurality of addresses in a received order, and the arbiter 620 combining the data received from the master intellectual property M2 with an address which is first stored in the temporary memory 610 and transmitting the combined packet to the network router (R1) 180.

The master network interface 140 connected with the master intellectual property M3 includes the packet encoder 810 and the arbiter 820, the packet encoder 810 transmitting a handshake signal to the master intellectual property M3 to prevent transmission of another address until data corresponding to a previously received address is received from the master intellectual property M3, and the arbiter 820 receiving the previously received address from the packet encoder 810 when the data is received and transmitting a combined packet of the received address and data to the network router (R1) 180.

The slave network interfaces 150 and 160 receive the address and data transmitted from the master intellectual properties M0 and M1, and receive the combined packet transmitted from the master intellectual properties M2 and M3.

To fully support multiple outstanding address functions of the master intellectual properties M0 and M1, the slave network interfaces 150 and 160 include the content addressable memory 410. The content addressable memory has a space for eight addresses, the eight addresses being generated by a multiplication of '2' by '4', i.e. a number of the master intellectual properties M0 and M1 (fully support multiple outstanding function) multiplied by a depth of multiple outstanding address functions.

The slave network interfaces 150 and 160 receive the combined packet transmitted from the master intellectual properties M2 and M3, and separate an address and data from the received combined packet.

A size of a memory circuit included in the NoC system 100 of the present invention is estimated as described below.

The temporary memory 610 included in the master network interface 130 is capable of storing four addresses.

The content addressable memory 410 respectively included in the slave network interfaces 150 and 160 is capable of storing eight addresses and a corresponding transaction number for each address.

Accordingly, the NoC system 100 may optimize data transmission/reception performance and reduce complexity of a hardware embodiment depending on how necessary a multiple outstanding address function is for each master intellectual property.

Figure 9:
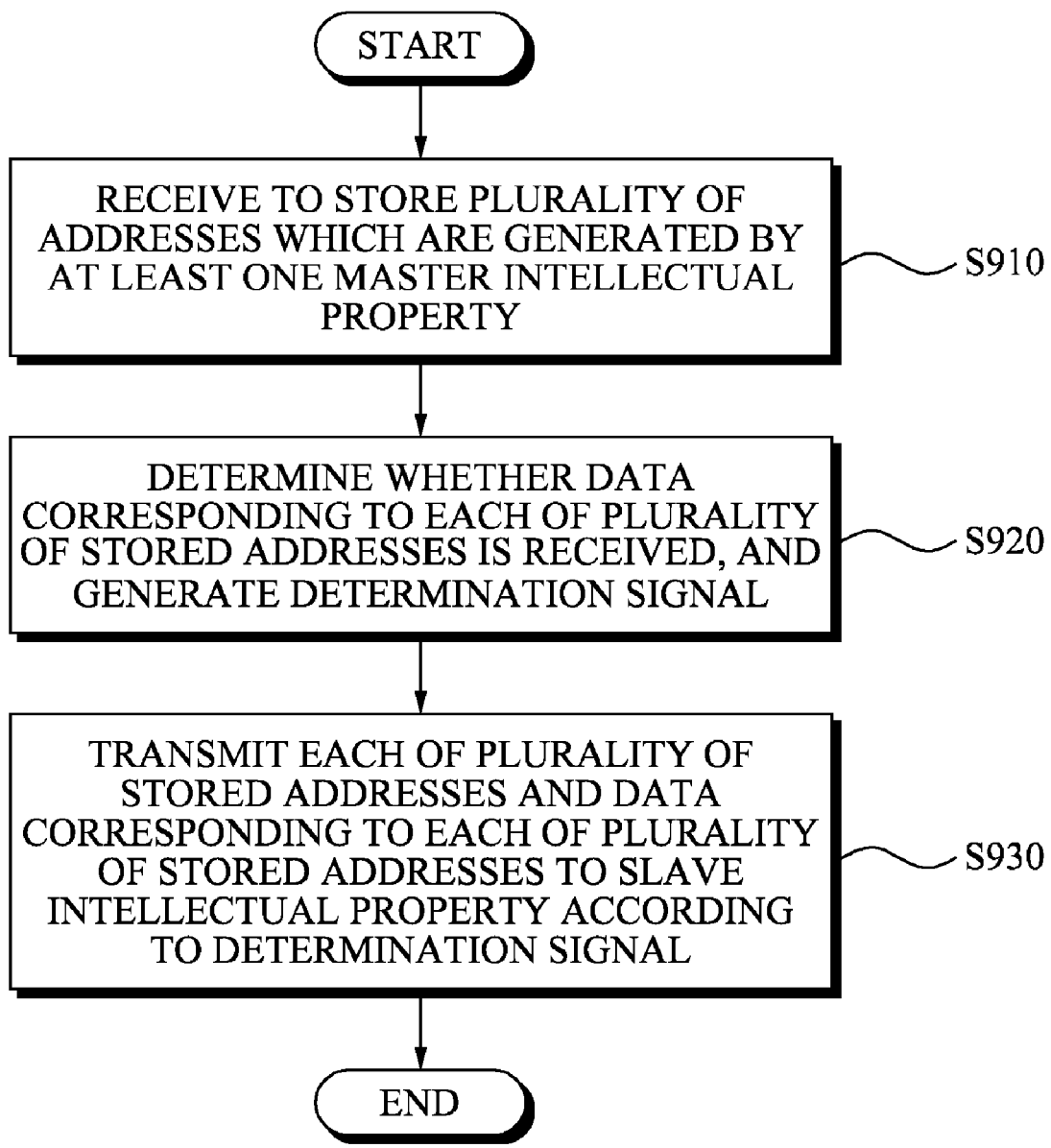
FIG. 9 is a flowchart illustrating a network control method according to an exemplary embodiment of the present invention.

FIG. 9 is a flowchart illustrating a network control method according to an exemplary embodiment of the present invention.

Referring to FIG. 9, the network control method receives to store a plurality of addresses which are generated by at least one master intellectual property in operation S910.

The network control method determines whether data corresponding to each of the plurality of stored addresses is received, and generates a determination signal in operation S920.

The network control method transmits each of the plurality of stored addresses and the data corresponding to each of the plurality of stored addresses to a slave intellectual property according to the determination signal in operation S930.

Figure 10:
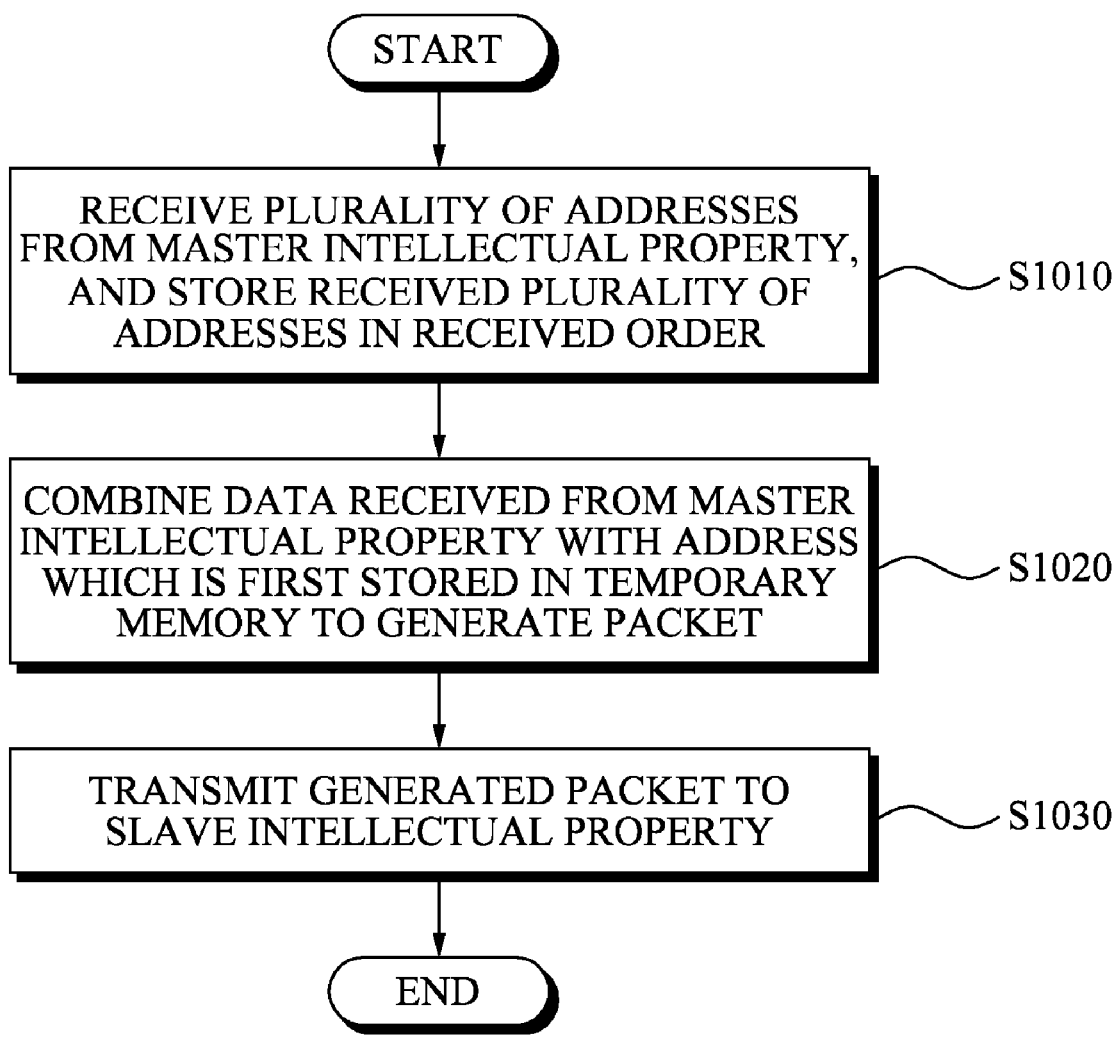
FIG. 10 is a flowchart illustrating a network control method according to another exemplary embodiment of the present invention.

FIG. 10 is a flowchart illustrating a network control method according to another exemplary embodiment of the present invention.

Referring to FIG. 10, the network control method receives a plurality of addresses from a master intellectual property, and stores the received plurality of addresses in a received order in operation S1010.

The network control method combines data received from the master intellectual property with an address which is first stored to generate a packet in operation S1020. In this instance, the network control method may generate the packet by substituting a payload flit for a tail flit of the address which is first stored, and for a head flit of the data.

The network control method transmits the generated packet to a slave intellectual property in operation S1030.

In this instance, the network control method may receive the generated packet, separate an address and data from the received packet to transmit the separated address and data to the slave intellectual property.

Figure 11:
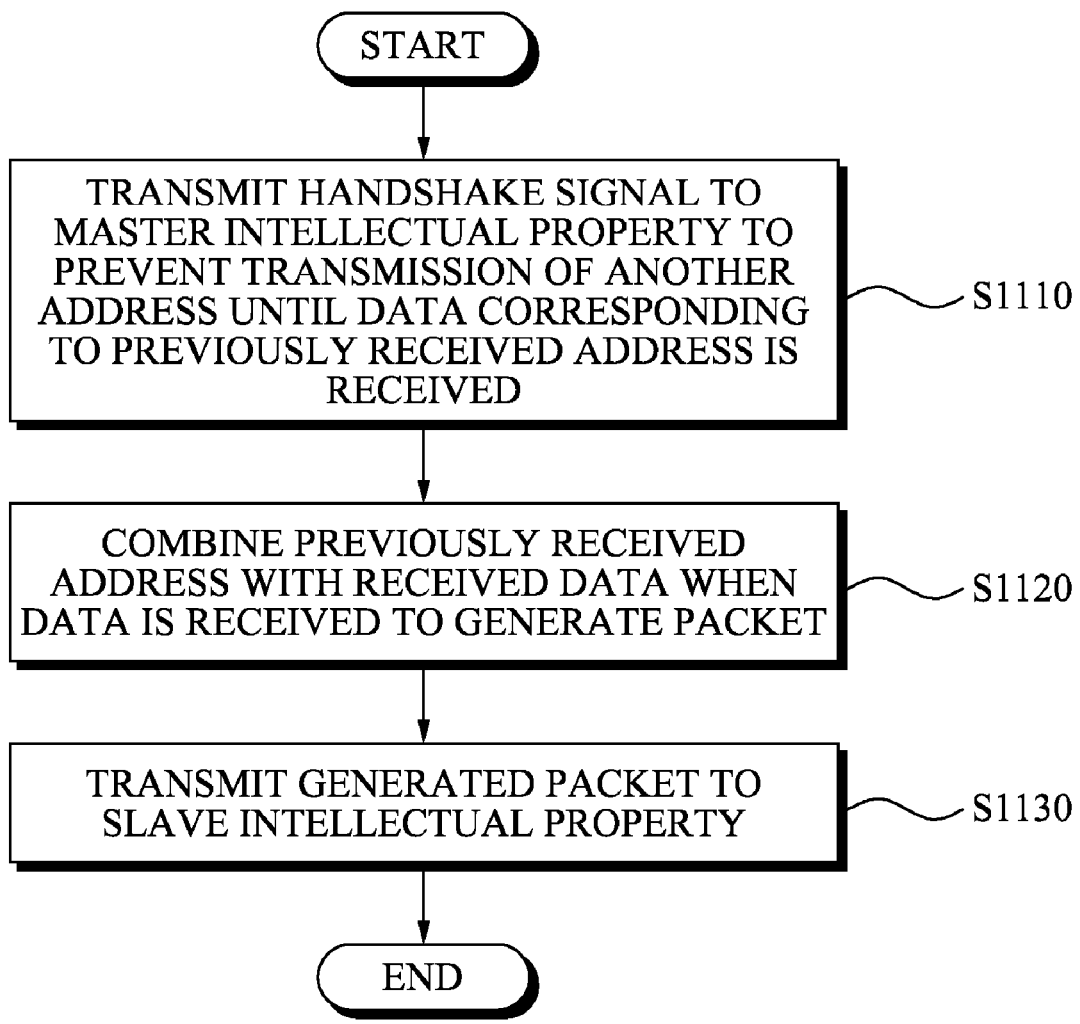
FIG. 11 is a flowchart illustrating a network control method according to still another exemplary embodiment of the present invention.

FIG. 11 is a flowchart illustrating a network control method according to still another exemplary embodiment of the present invention.

Referring to FIG. 11, the network control method transmits a handshake signal to a master intellectual property to prevent transmission of another address until data corresponding to a previously received address is received from the master intellectual property in operation S1110.

When the data is received, the network control method combines the previously received address with the received data to generate a packet in operation S1120.

In this instance, the packet may be generated by substituting a payload flit for a tail flit of the previously received address, and for a head flit of the data.

The network control method transmits the generated packet to a slave intellectual property in operation S1130.

The network control method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to exemplary embodiments of the present invention, there is provided a network control apparatus and a network control method which support a multiple outstanding address function without increasing a number of gates which configure a Bus, thereby reducing required space and power consumption, and can easily connect a plurality of intellectual properties (IPs).

Also, according to exemplary embodiments of the present invention, there is provided a network control apparatus and a network control method which can optimize data transmission/reception performance by selecting a suitable architecture according to a feature of a master intellectual property, without increasing complexity of a hardware embodiment.

Although a few exemplary embodiments of the present invention have been shown and described, the present invention is not limited to the described exemplary embodiments.

Instead, it would be appreciated by those skilled in the art that changes may be made to these exemplary embodiments without departing from the principles and spirit of the invention, the scope of which is defined by the claims and their equivalents.

What is claimed is:

1. A network control apparatus comprising:
a content addressable memory receiving to store a plurality of addresses which are generated by at least one master intellectual property, determining whether data corresponding to each of the plurality of stored addresses is received, and generating a determination signal based on whether the data corresponding to each of the plurality of stored addresses is received; and
a packet decoder transmitting each of the plurality of stored addresses and the data corresponding to each of the plurality of stored addresses to a slave intellectual property according to the determination signal,
wherein the network control apparatus is an on-chip network control apparatus installed on the same chip as the at least one master intellectual property and the slave intellectual property.

2. The network control apparatus of claim 1, wherein the content addressable memory receives to store the plurality of addresses which are generated by a plurality of master intellectual properties, determines whether the data, corresponding to each of the plurality of stored addresses and being generated by a same master intellectual property which generates each of the plurality of stored addresses, is received, and generates the determination signal.

3. The network control apparatus of claim 1, further comprising:
a master network interface receiving the plurality of addresses from the at least one master intellectual property, and transmitting the received plurality of addresses to the content addressable memory.

4. The network control apparatus of claim 1, wherein the packet decoder and the slave intellectual property are connected with each other via an address channel and a data channel, and the address channel and the data channel are separate from each other.

5. The network control apparatus of claim 1, wherein each of the plurality of addresses and each of the data respectively comprises an identification code corresponding to the each of the at least one master intellectual property.

6. The network control apparatus of claim 1, wherein each of the plurality of addresses and each of the data respectively comprises an identification code corresponding to each of transactions.

7. The network control apparatus of claim 1, wherein the content addressable memory has a space enabling storage of as many addresses as a number of the at least one master intellectual property multiplied by a maximum number of multiple issues.

8. A network control apparatus comprising:
a temporary memory receiving a plurality of addresses from a master intellectual property, storing the received plurality of addresses in a received order, and generating a determination signal based on whether data corresponding to each of the plurality of stored addresses is received; and
an arbiter combining the data received from the master intellectual property with an address which is first stored in the temporary memory to generate a packet, and transmitting the generated packet to a slave intellectual property according to the determination signal,
wherein the network control apparatus is an on-chip network control apparatus installed on the same chip as the master intellectual property and the slave intellectual property.

9. The network control apparatus of claim 8, further comprising:
a slave network interface receiving the generated packet from the arbiter, and separating an address and data from the received packet to transmit the separated address and data to the slave intellectual property,
wherein the arbiter transmits the generated packet to the slave intellectual property via the slave network interface.

10. The network control apparatus of claim 8, wherein the arbiter generates the packet by substituting a payload flit for a tail flit of the address which is first stored, and for a head flit of the data.

11. The network control apparatus of claim 8, wherein the temporary memory has a space enabling storage of as many addresses as a maximum number of multiple issues of the master intellectual property.

12. A network control apparatus comprising,
a packet encoder transmitting a handshake signal to a master intellectual property to prevent transmission of another address until data corresponding to a previously received address is received from the master intellectual property; and
an arbiter receiving the previously received address from the packet encoder when the data is received from the master intellectual property, combining the received address with the received data to generate a packet, and transmitting the generated packet to a slave intellectual property,
wherein the network control apparatus is an on-chip network control apparatus installed on the same chip as the master intellectual property and the slave intellectual property.

13. The network control apparatus of claim 12, further comprising:
a slave network interface receiving the generated packet from the arbiter, separating an address and data from the received packet to transmit the separated address and data to the slave intellectual property,
wherein the arbiter transmits the generated packet to the slave intellectual property via the slave network interface.

14. The network control apparatus of claim 12, wherein the arbiter generates the packet by substituting a payload flit for a tail flit of the received address, and for a head flit of the received data.

15. A network control apparatus comprising,
a master network interface receiving to store an address from a master intellectual property, generating a determination signal based on whether data corresponding to each of the plurality of stored addresses is received, and transmitting the address and data corresponding to the address to a slave intellectual property according to the determination signal;
a network router receiving the address and the data from the master network interface, and routing channels of the received address and the received data; and
a slave network interface receiving to store the address from the network router, and transmitting the stored address and the received data to the slave intellectual property when the data is received, wherein the network control apparatus is an on-chip network control apparatus installed on the same chip as the master intellectual property and the slave intellectual property.

16. The network control apparatus of claim 15, wherein the master network interface comprises:
   a temporary memory receiving a plurality of addresses from the master intellectual property, and storing the received addresses in a received order; and
   an arbiter combining the data received from the master intellectual property with an address which is first stored in the temporary memory, and transmitting a combined packet of the received address and data to the network router.

17. The network control apparatus of claim 15, wherein the slave network interface comprises:
   a content addressable memory receiving to store a plurality of addresses from the network router, determining whether the received data corresponding to each of the plurality of stored addresses is received, and generating a determination signal; and
   a packet decoder transmitting each of the plurality of stored addresses and the data corresponding to each of the plurality of stored addresses to the slave intellectual property according to the determination signal.

18. The network control apparatus of claim 15, wherein the master network interface comprises:
   a packet encoder transmitting a handshake signal to the master intellectual property to prevent transmission of another address until data corresponding to a previously received address is received from the master intellectual property; and
   an arbiter receiving the previously received address from the packet encoder when the data is received from the master intellectual property, combining the received address with the received data, and transmitting a combined packet of the received address and data to the network router.

19. A network control method comprising:
   receiving to store a plurality of addresses which are generated by at least one master intellectual property;
   determining whether data corresponding to each of the plurality of stored addresses is received, and generating a determination signal based on whether the data corresponding to each of the plurality of stored addresses is received; and
   transmitting each of the plurality of stored addresses and the data corresponding to each of the stored plurality of addresses to a slave intellectual property according to the determination signal,
   wherein the at least one master intellectual property and the slave intellectual property are installed on the same chip.

20. A network control method, comprising:
   receiving a plurality of addresses from a master intellectual property, and storing the received addresses in a received order, and generating a determination signal based on whether data corresponding to each of the plurality of stored addresses is received; and
   combining the data received from the master intellectual property with an address which is first stored to generate a packet, and transmitting the generated packet to a slave intellectual property according to the determination signal,
   wherein the master intellectual property and the slave intellectual property are installed on the same chip.

21. The network control method of claim 20, further comprising:
   receiving the generated packet, and separating an address and data from the received packet to transmit the separated address and data to the slave intellectual property.

22. The network control method of claim 20, wherein the combining of the data received from the master intellectual property with the address which is first stored to generate the packet generates the packet by substituting a payload flit for a tail flit of the address which is first stored, and for a head flit of the data.

23. A network control method comprising:
   transmitting a handshake signal to a master intellectual property to prevent transmission of another address until data corresponding to a previously received address is received from the master intellectual property; and
   combining the previously received address with the received data to generate a packet when the data is received, and transmitting the generated packet to a slave intellectual property,
   wherein the master intellectual property and the slave intellectual property are installed on the same chip.

24. The network control method of claim 23, wherein the combining of the previously received address with the received data to generate the packet when the data is received generates the packet by substituting a payload flit for a tail flit of the received address, and for a head flit of the received data.

* * * * *